(12) United States Patent
Bootsman et al.

(10) Patent No.: US 6,705,564 B2
(45) Date of Patent: Mar. 16, 2004

(54) DISPENSER

(75) Inventors: Gerrit Bootsman, Hoofddorp (NL); Alexander Oosterwijk, Uitgeest (NL)

(73) Assignee: Bootsman Holding B.V., Hoofddorp (NL)

( * ) Notice: Subject to any disclaimer, the term of this patent is extended or adjusted under 35 U.S.C. 154(b) by 0 days.

(21) Appl. No.: 10/361,560

(22) Filed: Feb. 11, 2003

(65) Prior Publication Data

US 2003/0122027 A1 Jul. 3, 2003

Related U.S. Application Data

(63) Continuation of application No. PCT/NL01/00608, filed on Aug. 16, 2001.

(30) Foreign Application Priority Data

Aug. 16, 2000 (NL) .............................. 1015946
Jul. 2, 2001 (NL) .............................. 1018441

(51) Int. Cl.[7] ............................................ B65D 85/02
(52) U.S. Cl. ................................................ 242/588.3
(58) Field of Search ......................... 242/588.3, 588.6, 242/594.2, 595.1; 206/409

(56) References Cited

U.S. PATENT DOCUMENTS

| 2,841,343 A | 7/1958 | Dorman |
| 4,978,085 A | 12/1990 | Letourneau |

FOREIGN PATENT DOCUMENTS

| DE | 89 06 040 | 8/1989 |
| EP | 0 462 934 | 12/1991 |
| FR | 2 760 440 | 9/1998 |
| WO | WO 98/04489 | 2/1998 |
| WO | WO 98/52811 | 11/1998 |

Primary Examiner—John Q. Nguyen
(74) Attorney, Agent, or Firm—Young & Thompson

(57) ABSTRACT

Dispenser containing a freely spinning supply roll (3) of compressed air tube (28) on a spool (4) and wherein during dispensing of the tube, the supply roll spins, such that the tube can be dispensed without buckling or becoming messy, wherein elements are present to allow the spool to spin tilting free and with little friction and also two or more dispensers can be easily mutually coupled, and the tube is guided through a slit (13) in a rubber body and the dispenser contains a heavy body (26).

13 Claims, 7 Drawing Sheets

DISPENSER

The invention is concerned with a dispenser containing a supply roll with a wire- or pipe shaped member. In the following, this member is referred to as "tube".

A particular, although not exclusive, field of application of the invention is pressurised air tube with a typical working pressure from about 5 atm pressure head. This pressurised air tube is generally fabricated of synthetic material, such as polyamid (PA), polyurethane (PU), polyethylene (PE) or polytetrafluorethylene (PTFE) and is relatively thick walled. Its outer diameter can vary in steps of 1 mm or 2 mm from 2 mm to 14 mm, such as 5, 6, 8, 10 or 12 mm, at a wall thickness between 0.5 and 1.5 mm, such as about 1 mm. Typically, immediately after extruding, this pressurised air tube is wound onto a supply roll. It is necessary to wind with a bending radius larger than 5 times the tube diameter to avoid local permanent deformations, such as buckles, of the tube. Commercially available supply rolls therefore have generally an inner diameter of 150 mm and an outer diameter of 300 mm. A virgin supply roll has typically a single tube with a length of tens of meters, such as 25, 50 or 100 m, depending on the tube diameter. The weight is substantially and is some kilos at the minimum, such as 5, 10, 15 kg or more.

A known dispenser consists of a relatively flat, square carton box of 300×300×100 mm containing a loose laying roll pressurised air tube, tightly fit and substantially immovable. The end of the tube projects through a large opening in the middle of one of the large faces of the box. By pulling said end, the desired length of the supply roll is pulled from the box. For that purpose, the box must lay on one of its large faces.

In view of the conditions provided by the character of the supply roll, such as substantial weight, avoidance of buckling or becoming messy of the tube, the object of the invention is an improved dispenser. This improvement can be at least one of the following aspects: improved ease of use; lower costs; multiple applicability; larger field of application; adapted for recycling; smaller space consumption; improvement of the safety or ergonomy at the working place; less of spoiling of tube.

Thus, a dispenser is proposed with a housing at least substantially containing a supply roll of tube, wherein means are present or appliances are provided, such that the supply roll must spin around its cross axis to obtain a length piece of the tube from the dispenser, after which the dispensed piece is separated from said supply roll.

The invention ensures, that the tube can reliably be dispensed by the dispenser. The housing provides, that the tube remains neatly packed on the supply roll while the dispenser each time dispenses a desired length of the tube. The supply roll is reliably and neatly packed within the dispenser, and cannot be lost therefrom, and the tube can be unrolled neatly and according to desire. The supply roll is easily replacable.

The dispenser can have one or more of the following characteristics, with which the desired spinning of the supply roll is easily ensured: a passage opening through which the tube extends in an at least substantially tangential direction from the supply roll, or a passage opening in an at least substantially parallel to the cross axis of the supply roll directed wall, through which the tube projects outside; a mandrel or core body around which the supply roll is present; flanges at one or both sides of the supply roll; wherein said mandrel and flanges can be united into a spool. The supply roll preferably does not project beyond the flange.

Preferably, the mandrel has a diameter of at least 50, more preferably at least 100 mm, such as about 150 mm. The supply roll can be wound thereabout loose or thight fitting. This mandrel is a means to maintain the inner diameter of the supply roll. The flange and/or mandrel is a means to avoid that the supply roll can jam within the dispenser, e.g. by tilting.

Preferably the mandrel and/or flanges are designed such that they spin with the supply roll. A flange spinning with the supply roll is a means to make sure that the supply roll can spin within the dispenser with low friction. For an as low as possible friction resistance, the contact surface between moving flange and adjacent stationary wall is preferably kept as low as possible, for which flange and/or wall can be provided with a profile such that at least a substantial mutual, preferably resilient pressing, line - or point contact is obtained. As an alternative or auxiliary, use can be made of at least one rotating bearing with which the supply roll or flange can be supported, preferably at its outer side. If the flange is not present or if the flange is stationary with respect to the supply roll, appliances are provided such that the supply roll bears with small contact surface against an adjacent wall or flange, which is therefore conveniently profiled.

In view of constructive simplicity and small friction resistance it is preferable, to support the supply roll in its upright position, i.e. with the plane in which it rotates during spinning dispensing of tube, at a location at its bottom side, preferably behind the spinning axis; front side (the side turned in the direction in which tube is dispensed) and preferably above the spinning axis; and one or both side faces, preferably above and/or below the spinning axis.

By way of alternative or auxiliary to the above, it is preferable for an as low as possible friction resistance, to provide a wall in the area against which the supply roll bears, at the side facing the supply roll, with at lease one window, indeed or not providing a through opening.

Experiments have shown that the supply roll must be able to spin with low friction resistance for a reliable action of the dispenser. By making use of an at least substantially tilting free spool supported within the dispenser and containing the supply roll, this desire can be met against relatively low costs. Accordingly it is preferable to provide the dispenser with tilting arresting means to ensure the action of the means to obtain spinning at low friction (e.g. spool, mandrel or flange). Such a tilting arresting means can be provided by a convenient projection. According to a preferred embodiment appliances are provided, such that the supply roll is at least in the direction of the spinning axis thightly fitting, and thus tilting free, housed within the dispenser.

Thus, in one aspect, the invention is based on the recognition, that an in many views surprisingly favourite dispensing of tube by the dispenser can be obtained by allowing the supply roll to spin, wherein preferably said spinning must take place at the least efforts, for which appliciances can be provided such as avoidence of tilting of the supply roll within the dispenser and/or making the friction resistance between supply roll and dispenser as low as possible, while the supply roll is excellent protected by a housing.

Preferably the dispenser has a means to avoid that the free end of the tube can automatically retract itself within the dispenser. An example of such a means is an arresting member to avoid that the supply roll can automatically spin in the direction opposite to the direction in which the tube is unwound. This arresting member can engage the mandrel, flange or spool. Preferably this arresting member is provided in that the end of the tube unwound from the supply roll is guided through a passage opening between opposite edges of preferably wear resistant material keeping the tube there between clamped and allowing slip, such that said tube and passage opening provide a so-called interference fit. This can be obtained by making said edges elastically resilient movable apart, to provide that the edges try to maintain a mutual distance that is smaller than the tube diameter. To ensure the desired brake action for different tube diameters, the passage opening can have an elongated shape, such as a slit of preferably at least 10 mm in elastically easily deformable material, such as an elastomere sheet. Preferably, the opposite edges keep a mutual short distance or bear against each other if the tube is not present there between.

Furthermore it is preferable that the dispenser contains a ballast weight, particularly when the housing is made of light weight material, such a plastic. By this ballast weight, the dispenser can be used while standing loose on the ground.

The housing is preferably box shaped, such as at least substantially square, more preferably relatively flat, possibly with rounded corners, and preferably adapted to be used with a narrow side downward directed, wherein the passage opening is present in a narrow side, preferably close to the upper side, if in the position of use. Preferably one narrow side is open, such that the supply roll or spool can be removed from the dispenser through said opening, which is possibly closed by a removable cover. Convenient releasable arresting means can be used to prevent that the supply roll or spool leaves the dispenser on its own.

The dispenser can be provided with means, such as a convenient projection or recess to mutually mount to corresponding dispensers. According to a preferred embodiment, the dispenser has a projection and at a distance therefrom a recess, such that with two corresponding mutually mounted dispensers, the projection of the one dispenser preferably tightly fitting engages the recess of the other dispenser to keep the dispensers in at least one direction mutually immovable, e.g. in that the projection is present at the one side and the recess is present at the same level at the opposite side of the dispenser. As an alternative or auxiliary, a separate mounting element can be provided, such as a resilient bracket, with two hook members, each engaging a respective hook edge of each dispenser, to mutually mount two dispensers. Preferably, the dispenser is provided with two such hook edges, arranged such that three corresponding dispensers with two identical mounting elements can be mutually mounted, wherein each mounting element engages two of the three dispensers. In this connection, the mounting elements can mutually at least partly overlap, preferably over about half their length. e.g., said hook edges are therefore symmetrically provided at the dispenser. Thus, with the invention, an assembly of separate, disconnectably mutually coupled dispensers can be easily coupled to a further dispenser. By mutually mounting two or more dispensers, their stability is improved.

The invention also concerns a wheeled device with at least one running wheel and provided with one or more dispensers, such as two or three, preferably arranged adjacent each other, e.g. within a niche, which is preferably at least substantially completely filled by said dispensers. Preferably the dispensers are easily removable contained in said niche. The assembly of the dispensers can at least substantially take the complete width of the device. Preferably the dispensers are fixed by means of releasable fixation means, such that they cannot leave the device on themselves.

According to an embodiment the device is tiltable and adapted to ride in a tilted position. The device can furthermore be provided with one or more containers, such as drawers, superpositioned, preferably above the dispensers, and wherein equipment and/or parts for e.g. assembly of pneumatic systems can be housed. Starting from the device as disclosed in NL-C-1006914 (corresponding to PCT/NL98/00293), and enclosed in here by reference, the device according to the invention can be obtained by removing the spools and mounting means therefore from the niche thereof, and to position two or more dispensers therein.

The invention also concerns use by a mechanic of the dispenser or the wheeled device when installing a pneumatic system, wherein it is used close to the installation area preferably loose standing and pneumatic tube of desired length is pulled from the dispenser, wherein the supply roll spins, and is separated and mounted along a desired track and is connected to a pneumatic source and a pneumatic user, such as an actuator, e.g. a pneumatic cilinder, wherein the mechanic removes required parts and/or equipment from the wheeled device.

Particularly when the tube has shape memory at least substantially corresponding to its winding diameter at the supply roll, e.g. because this tube is wound on the supply roll after extruding while still warm, the shape of the supply roll is automatically at least substantially maintained by this shape memory while at different times a piece of the tube is removed from the dispenser and separated from the supply roll. As such the proper, light running functioning of the dispenser is ensured for a long time.

In the following the invention is illustrated by way of a non-limiting, presently most preferred embodiment, while reference is made to the drawing, that shows in.

Figures 1, 2, 3, 4, 5:
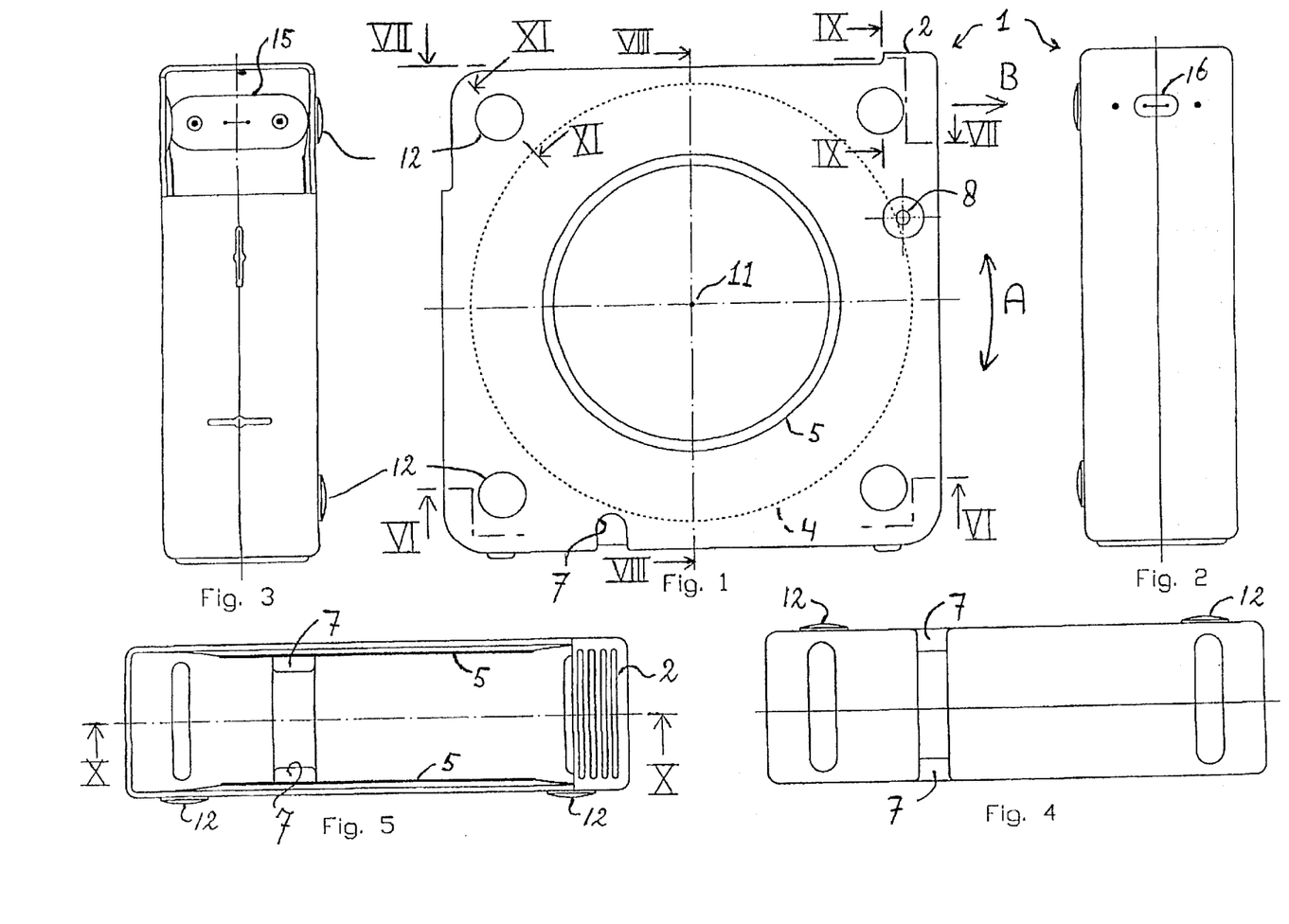
FIGS. 1–5 a side, front, back, bottom and top view, respectively, of a dispenser.
Figure 6:
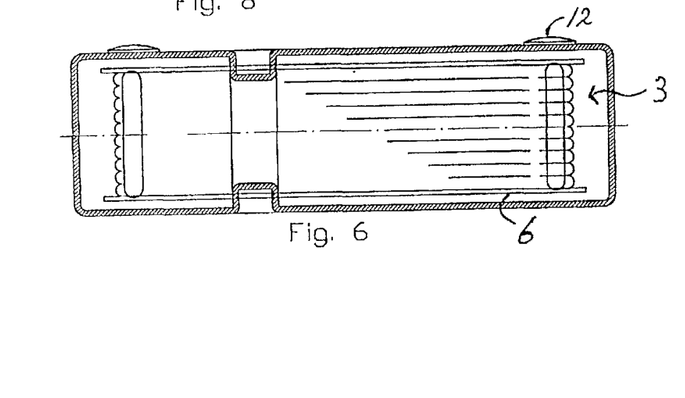
FIGS. 6–11 a sectional view of the dispenser along line VI—VI, VII—VII, VIII—VIII, IX—IX, X—X, respectively XI—XI in FIG. 1 or 5.
Figure 7:
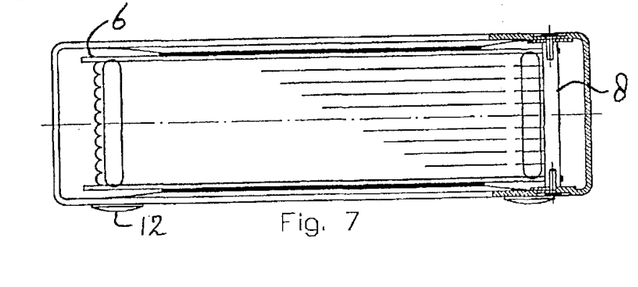
Figure 8:
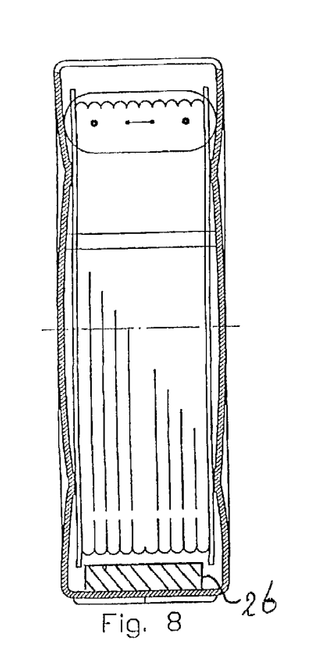
Figure 9:
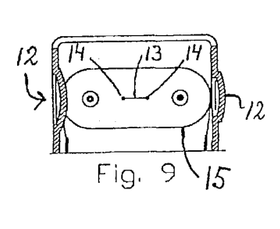
Figure 10:
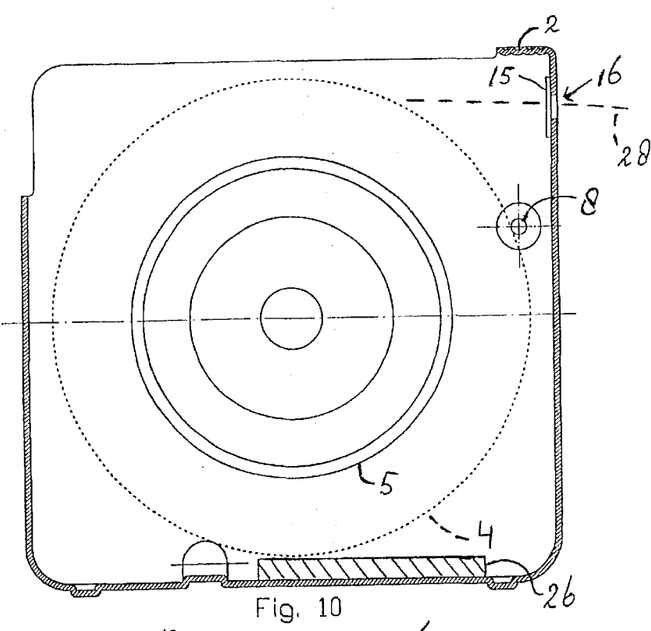
Figure 11:
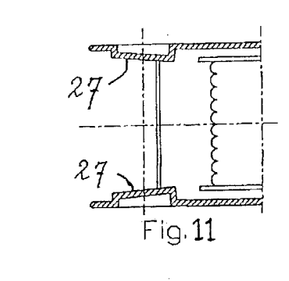

The stationary, loose standing on the ground supported dispenser 1 is of thin walled plastic, e.g. fabricated by rotation or injection moulding, and has a grip 2 for ease of transport. Apart from the grip 2, the dispenser 1 has an open top, as is the upper part of its back side, such that a supply roll 3 can easily be moved in and out the dispenser 1. The supply roll 3 is wound onto a spool 4, the contour of which is indicated in FIG. 1 in phantom, and which is removed in FIGS. 3, 5 and 10. The side walls with large surface of the dispenser 1 contain a ring shaped profile 5, bearing at many points around resiliently against the flanges 6 of the spool 4, as such clamping the spool tilting free between themselves and also supporting the spool 4 with small contact surface.

The spool 4 bears with the circumferential edge of its flange 6 with small contact surface against a fixed supporting rib 7 and a freely rotatable in the dispenser 1 mounted supporting roll 8, respectively, arranged such that they do not interfere changing the spool 4 through the open top side of the dispenser 1. Thus it is ensured that the spool 4 can spin with little friction around the rotating axis 11 in the direction of the arrow A (i.e. in the plane of the drawing of FIG. 1). In connection therewith the spool 4 is freely and stably supported within the dispenser and is pressed by gravity onto the rib 7 and by pulling tube 28 from the supply roll in the direction of the arrow B against roll 8.

Each side wall with large surface is provided at the outer side at the indicated locations close to each corner with a bulging part 12, at the one side wall to the inside and at the opposite side wall to the outside directed. If two dispensers are placed against each other with a side wall with large surface, the outwardly bulging part 12 of the one dispenser engages the inwardly bulging part 12 of the other dispenser, such that the dispensers are mutually mounted.

At the location of the upper bulging part 12 at the back side, the side walls with large surface have inwardly projecting cams 27, providing an interference for a respective flange 6 when the spool 4 moves out of the dispenser 1. In that way, the spool 4 can only be removed from the dispenser if the side walls with large surface are sufficiently moved apart at these cams 27, such that the flange 6 can freely pass the bulging part 12. This function of the cams 27 to arrest the spool 4, can e.g. also be provided by a material strip, extending between two side walls 4, which can temporarily be removed when replacing the spool 4. This arresting member can also be present at a different convenient location at the dispenser 1.

A ballast weight 26 extends within the dispenser 1 below the spool 4.

The front wall of the dispenser 1 is provided with an opening 13 through which the tube 28 of the supply roll 3 is dispensed. This opening 13 is a narrow slit with at both longitudinal ends tear stoppers 14 in an elastomere sheet 15 that is mounted such that it covers a relatively large hole 16 in the front wall of the dispenser. The passage device through this opening 13 is normal to the plane of the drawing of FIG. 2.

Figure 12:
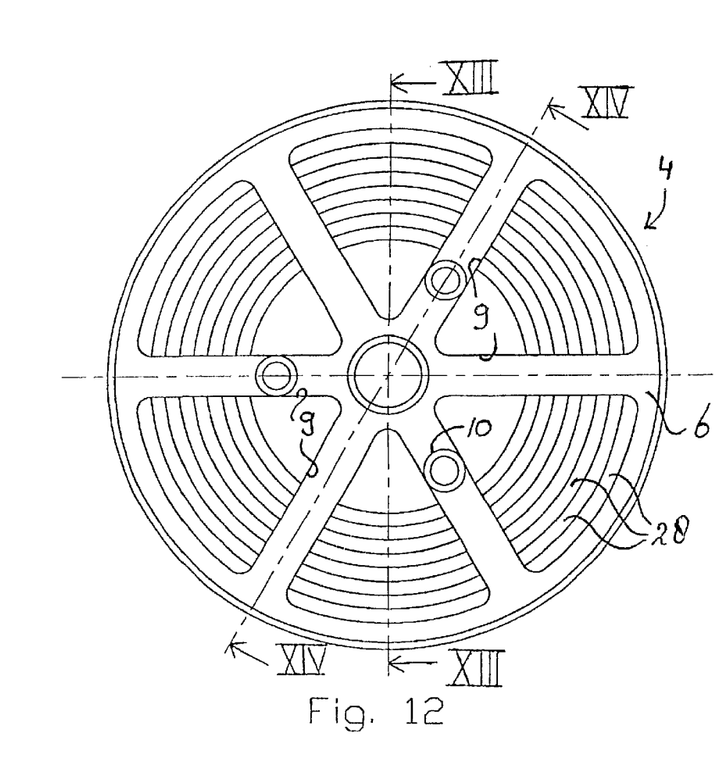
FIG. 12 a side view of a spool.
Figure 13:
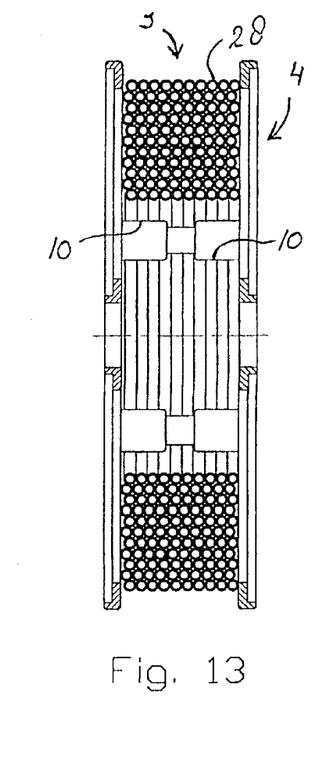
FIGS. 13–14 a sectional view of the spool along line XIII—XIII, XIV—XIV respectively, in FIG. 12.
Figure 14:
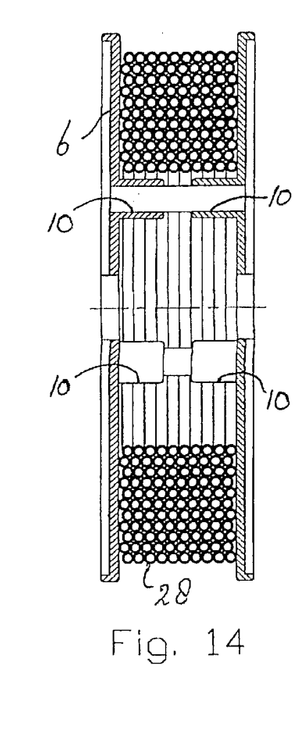
Figure 15:
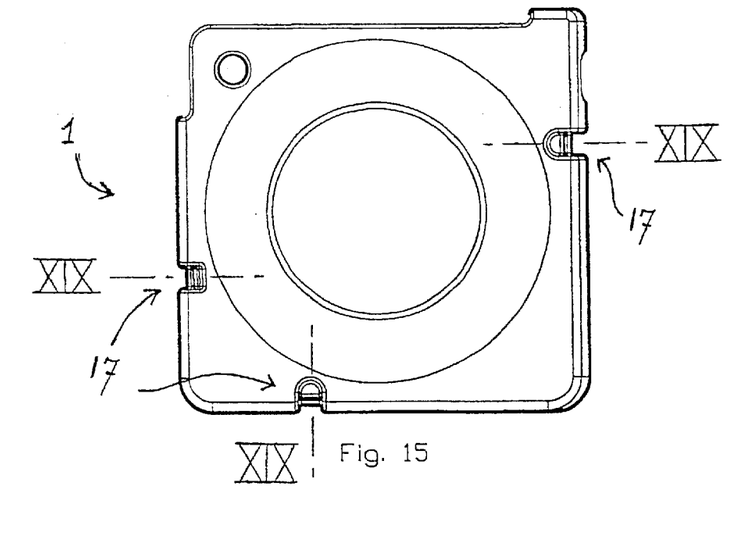
FIG. 15 a side view of an alternative dispenser.
Figure 16:
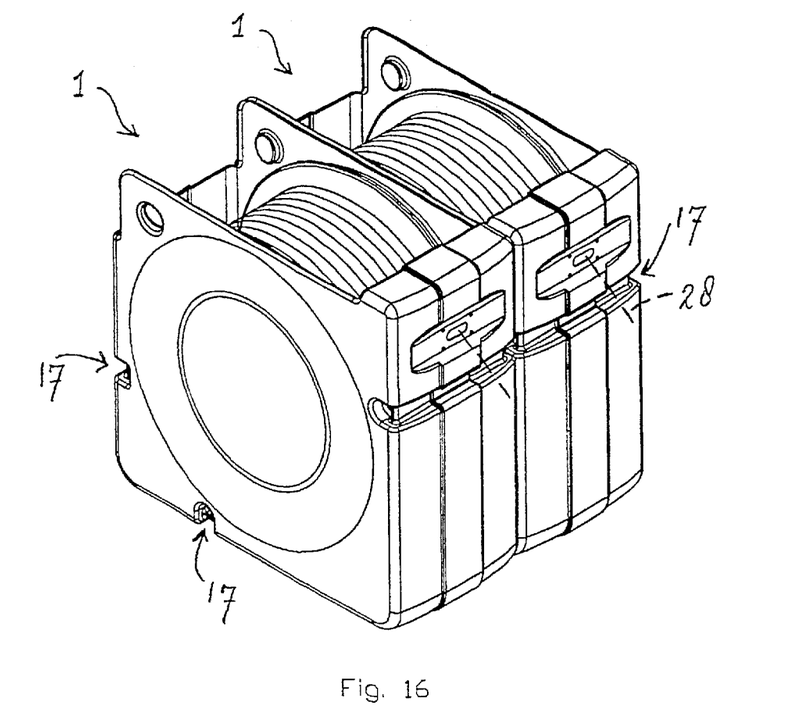
FIG. 16 a perspective view of two adjacent dispensers of FIG. 14.

The flange 6 of the spool 4 contains windows 9 (FIG. 12), such that the contact surface with the profile 5 (shown in phantom) is minimalised. The two co-axial flanges 6 of identical diameter, larger than that of the supply roll 3, are united by a core or hub body provided by three rods extending between the flanges 6 at least substantially equal angle distances, providing the minimum diameter of the supply roll 3. These rods are provided by thicker parts 10 at the relevant flange, with a recess in which a stud (not shown), bridging both flanges, can be inserted. By making use of studs of different length, the distance between the flanges 6 can be changed, such that the spool 4 can be used to supply rolls 3 of different width.

Figure 17:
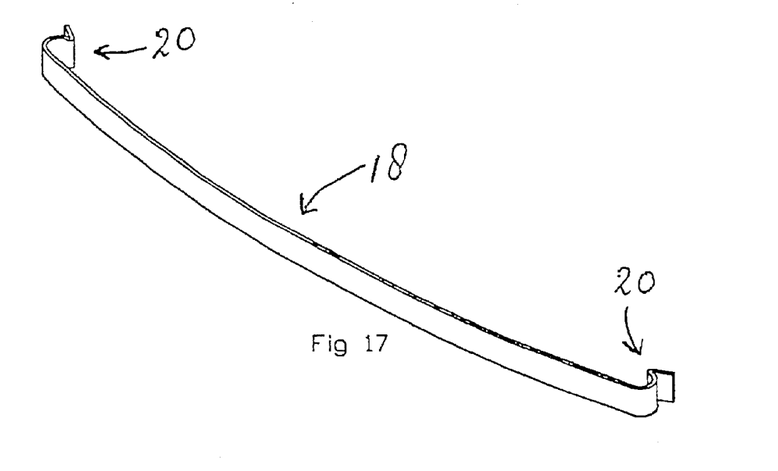
FIG. 17 a perspective view of a mounting bracket.
Figure 18:
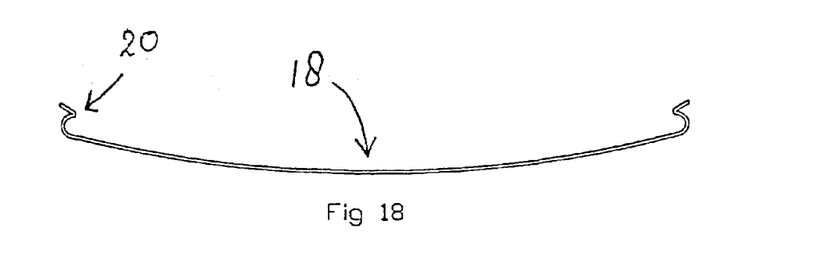
FIG. 18 a top view of the mounting bracket.
Figure 19:
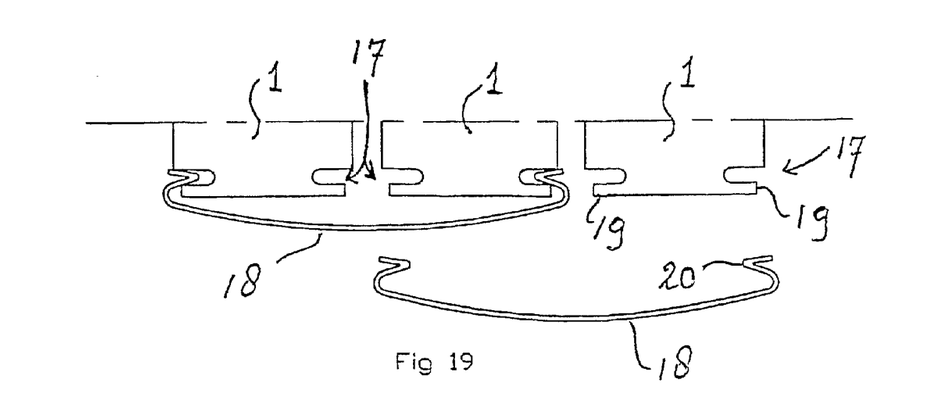
FIG. 19 a sectional view along line XIX—XIX in FIG. 15 of three adjacent dispensers.
Figure 20:
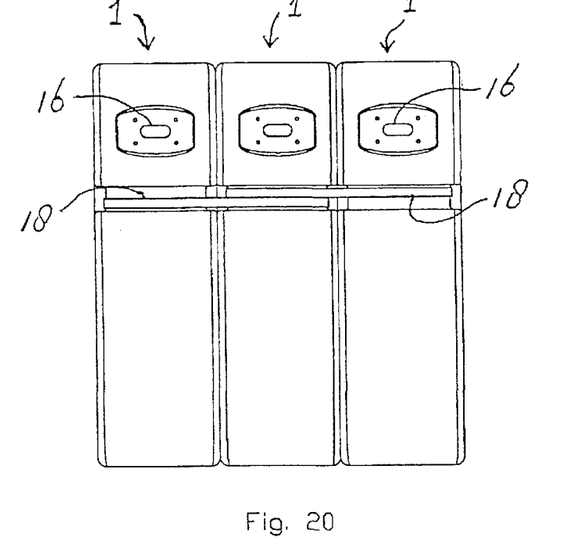
FIG. 20 a front view of three adjacent dispensers.
Figure 21:
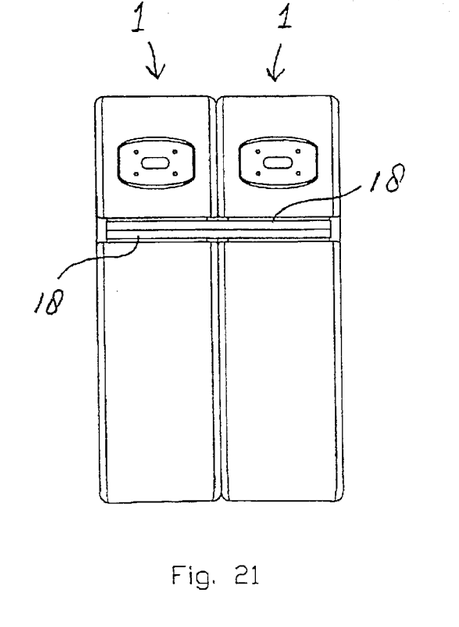
FIG. 21 a front view of two adjacent dispensers.

The dispenser 1 according to FIGS. 15, 16, 20, 21 contains a profile 17 at the front, bottom and back side, with which a mounting bracket 18, shown in FIGS. 17–18, of elastically resilient material, such as spring steel, can be removably hooked to mutually couple to adjacent dispensers 1. Therefore, the dispenser 1 contains hook edges 19 which can be resiliently moved apart and which co-operate with a relevant hook edge 20 of the bracket 18, of which the mounting position is shown in FIG. 19. A bracket 18 couples each time two immediately mutually adjacent dispensers 1 such that for coupling three adjacent dispensers, use is made of two brackets 18 at the same side, as FIG. 19 shows. It will be appreciated, that for reasons of clarity in FIG. 19 the mounting position of one of the bracket 18 is shown pulled apart. By mounting bracket 18 at the front and back side of the dispensers, the stability of the assembly is increased.

Figure 22:
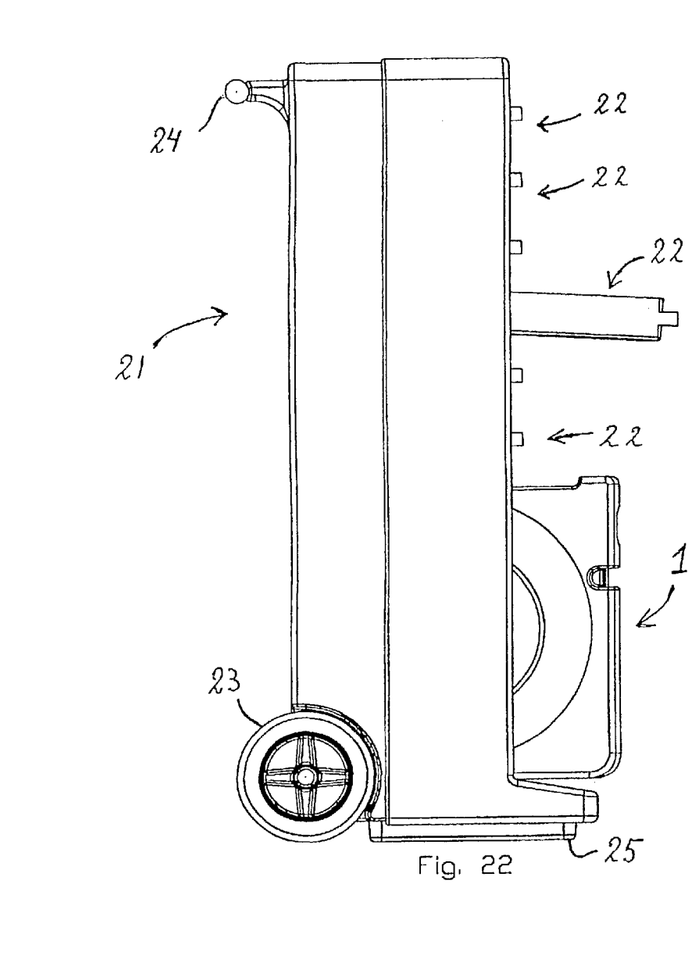
FIGS. 22–23 a side and front view, respectively, of a wheeled device.
Figure 23:
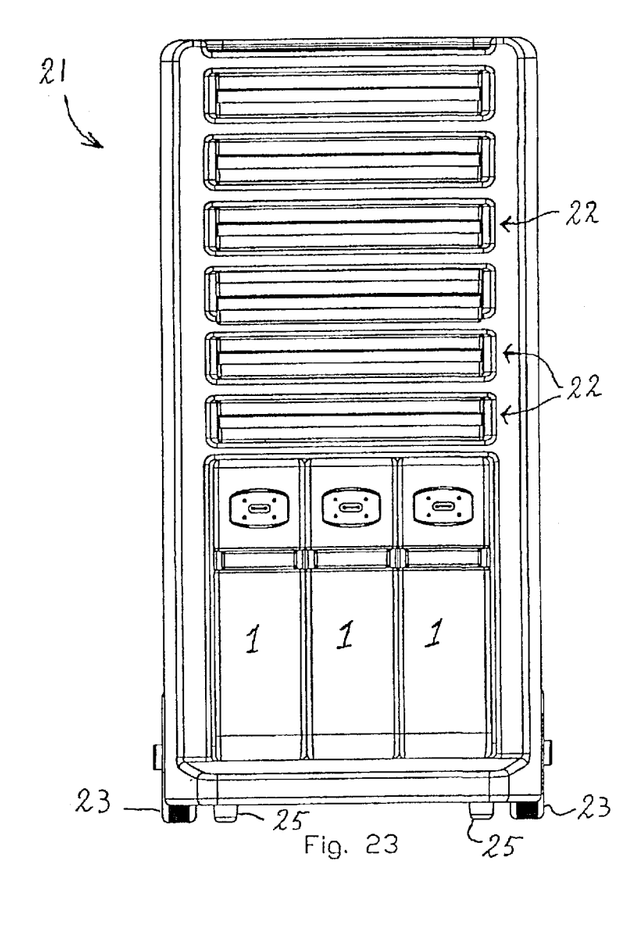

FIGS. 22 and 23 show a tilting utility cart 21 with a frame providing openings each containing one of the superpositioned slide drawers 22 with tight fit. The cart has at the back side on both sides a running wheel 23 and at the top a grip 24 for tilting between the upright resting position and the backwardly tilted riding position (now shown). In the resting position, the front rests on the underground through a supporting block 25. The lower part of the cart 21 contains a recess, in which three dispensers 1 according to the invention are contained standing next to each other, arrested therein to avoid that they unintentionally slide therefrom. A door or other barrier in front of the dispensers 1 and slide drawers 22 is not present, such that they are always immediately outwardly accessible from the front side of the device, to remove contents therefrom.

Figure 24:
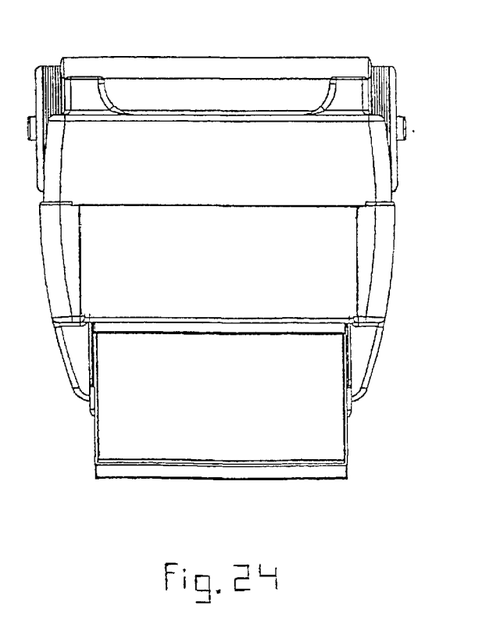
FIG. 24 shows a top view of the cart shown in FIGS. 22 and 23.

FIG. 24 shows a top view of the cart 21 shown in FIGS. 22 and 23, with one slide drawer 22 extended.

It will be appreciated that the invention is not limited to the examples described above and shown in the drawing.

What is claimed is:

1. A free standing, box like, thin walled dispenser having a narrow bottom wall, opposite side walls and opposite front and back walls and open at the top, said dispenser containing a single, freely spinning, floating supported spool (4) having a hub (10), opposite flanges (6) and a horizontal spinning axis (11) and containing a supply roll (3) made of a plurality of windings of a relatively thick walled, buckle free, hollow tube (28) with a length of at least 10 meters, a wall thickness of between about 0,5 mm and 1,5 mm and an outer diameter between about 2 mm and about 14 mm and fabricated from PA, PU, PE or PTFE or another plastic material with similar Young's modulus, and the supply roll has an inner diameter of at least about 5 times the outer diameter of the pneumatic tube; said flanges (6) having a diameter larger than the diameter of said supply roll, said flanges supporting said spool (4) within said dispenser by bearing against inwards projecting fixed bearing surfaces (7, 8) of said dispenser below and in front of said spool and provided in said front and bottom wall by detents in the outer face thereof; said dispenser having a passage opening (13) for the tube arranged such in said front wall with respect to said supply roll, that said tube extends above said spinning axis in a tangential direction from said supply roll to said passage opening such that the supply roll spins inside said dispenser when said tube is pulled from said supply roll through said passage opening during dispensing of said tube (28) such that the tube can be dispensed by unwinding from said supply roll without buckling or becoming messy; said open top of said dispenser allowing withdrawal of the complete spool from said dispenser.

2. Dispenser according to claim 1, wherein the inner faces of its opposite side walls have inwards projecting bearing surfaces (5) in their central area's providing a sideways support for the spool (4) such that the radial outer edge of the flanges (6) of said spool (4) are kept at a distance to said opposite side walls, allowing the spool to spin with small friction within said dispenser and keeping said spool tilting free within said dispenser.

3. Dispenser according to claim 2, wherein said inwards projecting bearing surfaces (5) are provided by inwards bulging of said opposite side walls.

4. Dispenser according to claim 3, wherein each said opposite side wall contains a flat circular central area, providing said inwards projecting bearing surface (5), inwards shifted relative to the circumferential area of the relevant said opposite side wall and wherein said circumferential area and said flat circular central area smoothly merge.

5. Dispenser according to claim 1, wherein said dispenser contains means to easily mutually couple two or more corresponding dispensers, comprising at least one cam (12) outwardly projecting from one opposite side wall and a corresponding detent (12) at outer face of the opposite side wall such that said cam of the one dispenser projects into said detent of another, identical dispenser standing next to it and in line with it.

6. Dispenser according to claim 1, wherein said dispenser contains means to easily mutually couple two or more corresponding dispensers, comprising at least one recess (17) at said front, back or bottom wall providing a sideways directed hook edge (19) such that the corresponding hook edges of two identical dispensers standing next to each other and in line are directed away from each other and said dispensers can be mutually coupled by a separate mounting bracket (18) of spring material having dimensions, a bent shape and hook edges (20) at its longitudinal ends for snappingly engaging said hook edges (19) at said dispensers for tightly coupling said dispensers and keeping them squeezed together.

7. Dispenser according to claim 6, wherein said recess (17) contains two opposite directed hook edges (19) such that three or more corresponding dispensers, standing next to each other and in line, can be mutually coupled with identical mounting brackets (18) with which two corresponding dispensers can be coupled, wherein each time two mounting brackets (18) mutually overlap about their half length.

8. Dispenser according to claim 6, wherein at least one recess (17) is present at both the front, back and bottom wall, each said recess (17) having a said hook edge (19), such that a three point coupling can be provided between two identical dispensers standing next to each other and in line.

9. Dispenser according to claim 8, wherein each said recess is provided by a detent in the outer face of the relevant said front, back or bottom wall, providing a corresponding projection at the inner face of the relevant said front, back or bottom wall, providing said inwards projecting fixed bearing surfaces (7, 8) for the spool (4).

10. Dispenser according to claim 1, wherein said back wall has a top part having a recess connecting to said open top side and said front wall has a projection (2) at its top edge, providing a grip and projecting into said open top side, said recess and projection being dimensioned such that said spool can only be completely removed from said dispenser while simultaneously moving through both said open top side and said recess.

11. Dispenser according to claim 1, wherein said passage opening (13) is provided by an elongated, straight lined slit of at least 10 mm in a rubbery body provided in said front wall to provide a means to avoid unintended withdrawal of said tube within said dispenser and projecting through said passage opening while said tube is uncoiled from said spool by pulling on the free end projecting outside said dispenser.

12. Dispenser according to claim 1, wherein the opposite side walls contain inwards projecting cams at the top corner near the back wall and beyond the flanges of said spool, which cams provide bearing surfaces for the circumference of the flanges if the spool is lifted, such that unintended removal of said spool is prevented, while said cams are provided by cetents in the outer face of said side walls.

13. Dispenser according to claim 1, wherein the tube has a shape memory corresponding to its winding diameter at the supply roll in that this member is wound on the supply roll after extruding while still warm, such that the shape of the supply roll is automatically maintained by this shape memory while the tube is intermittendly dispensed from said dispenser.

* * * * *